United States Patent [19]
Deering

[11] Patent Number: 5,440,682
[45] Date of Patent: Aug. 8, 1995

[54] DRAW PROCESSOR FOR A HIGH PERFORMANCE THREE DIMENSIONAL GRAPHIC ACCELERATOR

[75] Inventor: Michael F. Deering, Los Altos, Calif.

[73] Assignee: Sun Microsystems, Inc., Mountain View, Calif.

[21] Appl. No.: 82,065

[22] Filed: Jun. 23, 1993

Related U.S. Application Data

[63] Continuation-in-part of Ser. No. 71,699, Jun. 4, 1993.

[51] Int. Cl.[6] .............................................. G06F 15/00
[52] U.S. Cl. ......................................................... 395/162
[58] Field of Search ................. 395/162, 163, 119, 134

[56] References Cited

U.S. PATENT DOCUMENTS

| | | | |
|---|---|---|---|
| 5,159,665 | 10/1992 | Priem et al. | 395/134 |
| 5,220,650 | 6/1993 | Barkans | 395/163 |
| 5,293,480 | 3/1994 | Miller et al. | 395/163 |
| 5,307,449 | 4/1994 | Kelley et al. | 395/119 |

FOREIGN PATENT DOCUMENTS 3924759  7/1989  Germany .

OTHER PUBLICATIONS

B. Borden, "Graphics Processing on a Graphics Supercomputer", IEEE Comp. Graph. & Appl., Jul. 1990, pp. 56–62.
C. Priem, "Developing the GX Graphics Accel. Archit.", IEEE MICRO, Feb. 1990 pp. 44–54.
C. Priem, "Software in Silicon: The Methodology Behind Sun's GX Graphics Accel. Archit.", IEEE Conference, pp. 195–197.

*Primary Examiner*—Mark R. Powell
*Assistant Examiner*—U. Chauhan
*Attorney, Agent, or Firm*—Blakely Sokoloff Taylor & Zafman

[57] ABSTRACT

A draw processor for a graphics accelerator is disclosed that performs edgewalking and scan interpolation functions to render a three dimensional geometry object defined by a draw packet. The draw processor renders a subset of pixels on a scan line, such that a set draw processors taken together render the entire geometry object. The draw processor renders pixels into an interleave bank of a multiple bank interleaved frame buffer. The draw processor also processes direct port data through a direct port pipeline.

17 Claims, 12 Drawing Sheets

Figure 7

3D Geometry Pipeline Commands

| db_Reg# | Format | Dot | RGB-Dot | Vector | RGB-Vector | Triangle | Wr-Reg | Fast Clr |
|---|---|---|---|---|---|---|---|---|
| dbr0 | 16 bit | header | header | header | header | header | header | header |
| dbr1 | 32 bit | x | x | us | us | xs | | x |
| dbr2 | 32 bit | y | y | vs | vs | xe2 | | y |
| dbr3 | 32 bit | z | z | zs | zs | zs | data | |
| dbr4 | 32 bit | | r | | r | rs | | |
| dbr5 | 32 bit | | g | | g | gs | | |
| dbr6 | 32 bit | | b | | b | bs | | |
| dbr7 | 32 bit | | | ue | ue | xe | | |
| dbr8 | 32 bit | | | dzdu | dzdu | dzdu | | |
| dbr9 | 32 bit | | | | drdu | drdu | | |
| dbr10 | 32 bit | | | | dgdu | dgdu | | |
| dbr11 | 32 bit | | | | dbdu | dbdu | | |
| dbr12 | 32 bit | | | dvdu | dvdu | | | |
| dbr13 | 32 bit | | | | | ys | | |
| dbr14 | 32 bit | | | | | count12 | | count |
| dbr15 | 32 bit | | | | | count13 | | |
| dbr16 | 32 bit | | | | | dxsdv | | |
| dbr17 | 32 bit | | | | | dxedv | | |
| dbr18 | 32 bit | | | | | dxe2dv | | |
| dbr19 | 32 bit | | | | | dzdv | | |
| dbr20 | 32 bit | | | | | drdv | | |
| dbr21 | 32 bit | | | | | dgdv | | |
| dbr22 | 32 bit | | | | | dbdv | | |
| dbr23 | 32 bit | | | | | | address | |

| Code | Z Compare | Z Update | Application |
|---|---|---|---|
| 0000 | No | No | Don't write Z |
| 01c0 | No | Yes | Write Z, no HSR |
| 10c0 | Yes | No | Write to RGB only, if Z is in front |
| 11c0 | Yes | Yes | Write RGB and Z, if Z is in front |

*Figure 8*

| Code | WID Ext Clip | WID Ext Replace |
|---|---|---|
| 0010 | No | No |
| 1101 | Yes | Yes |
| 1111 | Yes | Yes |
| 0011 | Yes | No |
| 0110 | No | Yes |
| 0111 | Yes | Yes |

*Figure 9*

| Pix In Viewport | Pick Without Render | WID Match | HSR Win | Screen Door Write Enable | Fast Clear Enable | Access Mode | Data Out to Frame Buffer |
|---|---|---|---|---|---|---|---|
| 1 | x | x | x | x | x | W | Bit M (Window Mast, Pipe data, FB Data In) |
| 0 | x | x | x | x | x | W | FB Data In |
| 0 | x | x | x | x | x | I, D, ID | FB Data In |
| x | 1 | x | x | x | x | I, D, ID | FB Data In |
| x | x | 0 | x | x | x | I, D, ID | FB Data In |
| x | x | x | 0 | x | x | I, D, ID | FB Data In |
| x | x | x | x | 0 | x | I, D, ID | FB Data In |
| 1 | 0 | 1 | 1 | 1 | 0 | I, D, ID | FB Data In |
| 1 | 0 | 1 | 1 | 1 | 1 | I, D, ID | Bit M (Decode FC Plane, 0x3F, FB Data In) |

*Figure 10*

| Pix In View Port | Pick Without Render | WID Match | HSR Win | Screen Door Write Enable | Window Enable | Access Mode | Data Out to Frame Buffer |
|---|---|---|---|---|---|---|---|
| x | x | x | x | x | 0 | W | FB Data In |
| 0 | x | x | x | x | 1 | W | FB Data In |
| 1 | x | x | x | x | 1 | W | Bit M (Window Mask, Pipe Data, FB Data In) |
| 0 | x | x | x | x | x | I, D, ID | FB Data In |
| x | 1 | x | x | x | x | I, D, ID | FB Data In |
| x | x | 0 | x | x | x | I, D, ID | FB Data In |
| x | x | x | 0 | x | x | I, D, ID | FB Data In |
| x | x | x | x | 0 | x | I, D, ID | FB Data In |
| x | x | x | x | 1 | 0 | I, D, ID | FB Data In |
| 1 | 0 | 1 | 1 | 1 | 1 | I, D, ID | Bit M (Window Mask, Pipe Data, FB Data In) |

*Figure 11*

| PixIn ViewPort | Pick Without Render | WID Match | HSR Win | Screen Door Write Enable | Image Enb | Fast Clear Enb | Fast Clear Bit | Access Mode | ROP or Blend Source (SRC) | Data Out to Frame Buffer |
|---|---|---|---|---|---|---|---|---|---|---|
| x | x | x | x | x | x | x | x | W | x | FB Data In |
| 0 | x | x | x | x | x | x | x | I,D,ID | x | FB Data In |
| x | 1 | x | x | x | x | x | x | I,D,ID | x | FB Data In |
| x | x | 0 | x | x | x | x | x | I,D,ID | x | FB Data In |
| x | x | x | 0 | x | x | x | x | I,D,ID | x | FB Data In |
| x | x | x | x | 0 | x | x | x | I,D,ID | x | FB Data In |
| x | x | x | x | x | 0 | x | x | I,D,ID | x | FB Data In |
| 1 | 0 | 1 | 1 | 1 | 1 | 0 | x | I,ID | FB D In | Bit M (Mask, ROP/Blend Out, FB Data In) |
| 1 | 0 | 1 | 1 | 1 | 1 | 1 | 1 | I,ID | FB D In | Bit M (Mask, ROP/Blend Out FB Data In) |
| 1 | 0 | 1 | 1 | 1 | 1 | 1 | 0 | I,ID | BG | Bit M (Mask, ROP/Blend Out, BG) |
| 1 | 0 | 1 | 1 | 1 | 1 | 0 | x | D | x | FB Data In |
| 1 | 0 | 1 | 1 | 1 | 1 | 1 | 1 | D | x | FB Data In |
| 1 | 0 | 1 | 1 | 1 | 1 | 1 | 0 | D | x | BG |

*Figure 12*

| Pick In View Port | Pick Without Render | WID Match | HSR Win | Screen Door Write Enable | Z Group Enable | Z Write Enable | Fast Clear Enable | Fast Clear Bit | Access Mode | Data Out To Frame Buffer |
|---|---|---|---|---|---|---|---|---|---|---|
| x | x | x | x | x | x | x | x | x | W | FB Data In |
| 0 | x | x | x | x | x | x | x | x | I, D, ID | FB Data In |
| x | 1 | x | x | x | x | x | x | x | I, D, ID | FB Data In |
| x | x | 0 | x | x | x | x | x | x | I, D, ID | FB Data In |
| x | x | x | 0 | x | x | x | x | x | I, D, ID | FB Data In |
| x | x | x | x | 0 | x | x | x | x | I, D, ID | FB Data In |
| x | x | x | x | x | 0 | x | x | x | I, D, ID | FB Data In |
| 1 | 0 | 1 | 1 | 1 | 1 | 1 | 0 | x | ID, D | Znew |
| 1 | 0 | 1 | 1 | 1 | 1 | 1 | 1 | 1 | ID, D | Znew |
| 1 | 0 | 1 | 1 | 1 | 1 | 1 | 1 | 0 | ID, D | Znew |
| 1 | 0 | 1 | 1 | 1 | 1 | 0 | 0 | x | ID, D | FB Data In |
| 1 | 0 | 1 | 1 | 1 | 1 | 0 | 1 | 1 | ID, D | FB Data In |
| 1 | 0 | 1 | 1 | 1 | 1 | 0 | 1 | 0 | ID, D | 0xFF FFFF |
| 1 | 0 | 1 | 1 | 1 | 1 | x | 0 | x | I | FB Data In |
| 1 | 0 | 1 | 1 | 1 | 1 | x | 1 | 1 | I | FB Data In |
| 1 | 0 | 1 | 1 | 1 | 1 | x | 1 | 0 | I | 0xFF FFFF |

DRAW PROCESSOR FOR A HIGH PERFORMANCE THREE DIMENSIONAL GRAPHIC ACCELERATOR

RELATED APPLICATIONS

This application is a continuation-in-part of U.S. patent application Ser. No. 08/071,699, filed on Jun. 4, 1993, entitled An Architecture for a High Performance Three Dimensional Graphics Accelerator.

BACKGROUND OF THE INVENTION

1. Field of the Invention

This invention relates to the field of computer graphics systems. More particularly, this invention relates to a draw processor for a high performance three dimensional graphics accelerator in a computer system.

2. Art Background

A three dimensional graphics accelerator is a specialized graphics rendering subsystem for a computer system. Typically, an application program executing on a host processor of the computer system generates three dimensional geometry input data that defines three dimensional graphics elements for display on a display device. The application program typically transfers the geometry input data from the host processor to the graphics accelerator. Thereafter, the graphics accelerator renders the corresponding graphics elements on the display device.

The design architecture of a high performance three dimensional graphics system historically embodies a balance between system performance and system cost. The typical design goal is to increase system performance while minimizing increases in system cost. However, prior graphics systems usually suffer from either limited performance or high cost due to a variety of system constraints.

For example, a high performance graphics system typically implements an interleaved frame buffer comprised of multiple VRAM banks because the minimum read-modify-write cycle time for commercially available video random access memory (VRAM) chips is a fundamental constraint on rendering performance. The implementation of multiple interleaved VRAM banks enables parallel pixel rendering into the frame buffer to increase overall rendering performance. Unfortunately, the separate addressing logic required for each interleave VRAM bank increases the cost and power consumption of such high performance systems.

On the other hand, a graphics system may implement a rendering processor on a single integrated circuit chip to minimize cost and power consumption. Unfortunately, such systems suffer from poor rendering performance due to the limited number of interface pins available with the single integrated circuit chip. The limited number of interface pins reduces the interleave factor for the frame buffer, thereby precluding the rendering performance benefits of parallel processing.

Prior graphics systems often employ a parallel processing pipeline to increase graphics processing performance. For example, the scan conversion function for a shaded triangle in a graphics system is typically performed by a linear pipeline of edgewalking and scan interpolation. Typically in such systems, the edgewalking function is performed by an edgewalking processor, and the scan interpolation function is performed by a set of parallel scan interpolation processors that receive parameters from the edgewalking processor.

However, such systems fail to obtain parallel processing speed benefits when rendering relatively long thin triangles, which are commonly encountered in tessellated geometry. The parameter data flow between the edgewalking processor and the scan interpolation processors greatly increases when performing scan conversion on long thin triangles. Unfortunately, the increased parameter data flow slows triangle rendering and reduces graphics system performance.

SUMMARY OF THE INVENTION

A draw processor for a graphics accelerator is disclosed that performs edgewalking and scan interpolation functions through a three dimensional geometry pipeline to render a three dimensional geometry object, and that performs pixel functions through a direct port pipeline. The draw processor renders a subset of pixels on a scan line, such that a set draw processors taken together render the entire geometry object. The draw processor renders pixels and processes the pixel functions into an interleave bank of a multiple bank interleaved frame buffer.

The draw processor comprises a geometry pipeline interface circuit that receives a draw packet over a draw bus from a floating-point processor, wherein the draw packet contains a set of geometry parameters that define a geometry object. The geometry pipeline interface circuit adjusts the geometry parameters according to an interleave value corresponding the draw processor.

The draw processor also comprises a rendering circuit that receives the geometry parameters from the geometry pipeline interface circuit, and that generates a set of pixels corresponding to the geometry object by performing edgewalking and scan interpolation functions according to the geometry parameters.

The draw processor also comprises a direct port interface circuit that receives a direct port packet over the draw bus from a command preprocessor. The direct port packet contains a set of pixel function parameters that control at least one pixel function of the draw processor.

The draw processor also comprises a memory control circuit that receives the pixels from the direct port interface circuit and the pixel function parameters from the direct port interface circuit. The memory control circuit writes the pixels into a frame buffer memory while performing the pixel function.

BRIEF DESCRIPTION OF THE DRAWINGS

FIG. 7 lists the format of the 3D geometry pipeline commands contained in output geometry packets, and shows the double buffer registers (dbr1-dbr23) employed for each parameter in a commands packet.

FIG. 8 shows the coding of the Z-Buffering control field for hidden surface removal (HSR) functions using Z as a depth buffer.

FIG. 9 shows the coding of the Z-Buffering control field for window ID (WID) functions using Z as a window ID extension.

FIGS. 10–13 illustrate the pixel operations of the draw processor, and show the conditions tested by the draw processor prior to pixel writes to the frame buffer.

DETAILED DESCRIPTION OF THE INVENTION

An architecture for a high performance three dimensional graphics accelerator in a computer system is disclosed. In the following description for purposes of explanation specific applications, numbers, apparatus, configurations and circuits are set forth in order to provide a thorough understanding of the present invention. However, it will be apparent to one skilled in the art that the present invention may be practiced without these specific details. In other instances well known systems are shown in diagrammatical or block diagram form in order not to obscure the present invention unnecessarily.

Figure 1:
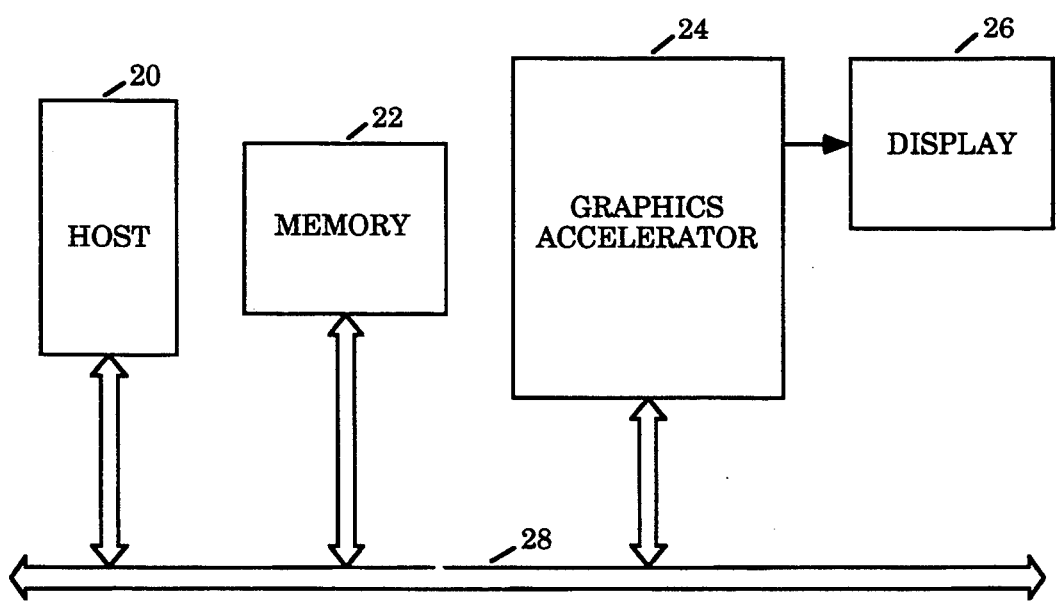
FIG. 1 is a block diagram of a computer system including a host processor, a memory subsystem, a graphics accelerator, and a display device.

Referring now to FIG. 1, a block diagram of a computer system is shown, including a host processor 20, a memory subsystem 22, a graphics accelerator 24, and a display device 26. The host processor 20, the memory subsystem 22, and the graphics accelerator 24 are each coupled for communication over a host bus 28.

The display device 26 represents a wide variety of raster display monitors. The host processor 20 represents a wide variety of computer processors, multiprocessors and CPUs, and the memory subsystem 22 represents a wide variety of memory subsystems including random access memories and mass storage devices. The host bus 28 represents a wide variety of communication or host computer busses for communication between host processors, CPUs, and memory subsystems, as well as specialized subsystems.

The host processor 20 transfers information to and from the graphics accelerator 24 according to a programmed input/output (I/O) protocol over the host bus 28. Also, the graphics accelerator 24 accesses the memory subsystem 22 according to a direct memory access (DMA) protocol.

A graphics application program executing on the host processor 20 generates geometry data arrays containing three dimensional geometry information that define an image for display on the display device 26. The host processor 20 transfers the geometry data arrays to the memory subsystem 22. Thereafter, the graphics accelerator 24 reads in geometry data arrays using DMA access cycles over the host bus 28. Alternatively, the host processor 20 transfers the geometry data arrays to the graphics accelerator 24 with programmed I/O over the host bus 28.

The three dimensional geometry information in the geometry data arrays comprises a stream of input vertex packets containing vertex coordinates (vertices), vertex position, and other information that defines triangles, vectors and points in a three dimensional space which is commonly referred to as model space. Each input vertex packet may contain any combination of three dimensional vertex information, including vertex normal, vertex color, facet normal, facet color, texture map coordinates, pick-id's, headers and other information.

A headerless input vertex packet may define a triangle strip in the form of a "zig zag" pattern of adjacent triangles. A headerless input vertex packet may also define a triangle strip in the form of a "star strip" pattern of triangles. In addition, a headerless input vertex packet may define a strip of isolated triangles. An input vertex packet having a header may change triangle strip formats for each triangle and change between "zig zag" format, "star" format, and isolated triangles.

Figure 2:
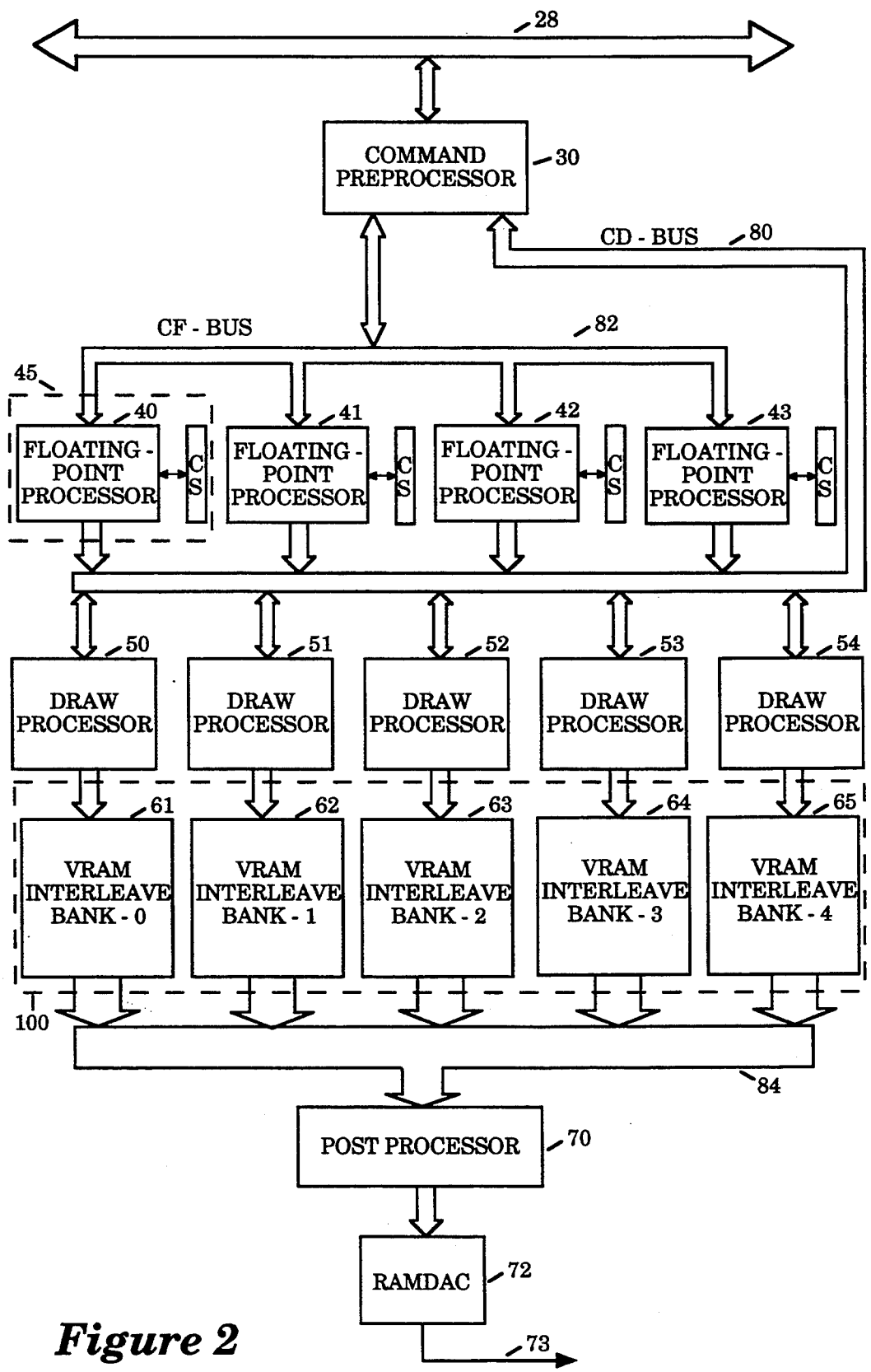
FIG. 2 is a block diagram of the graphics accelerator, which is comprised of a command preprocessor, a set of floating-point processors, a set of draw processors, a frame buffer, a post-processor, and a random access memory/digital-to-analog converter (RAMDAC).

FIG. 2 is a block diagram of the graphics accelerator 24. The graphics accelerator 24 is comprised of a command preprocessor 30, a set of floating-point processors 40-43, a set of draw processors 50-54, a frame buffer 100, a post-processor 70 and a random access memory/digital-to-analog converter (RAMDAC) 72. The RAMDAC 72 is similar to commercially available RAMDACs that implement look-up table functions.

For one embodiment, the command preprocessor 30, the floating-point processors 40-43, the draw processors 50-54, and the post-processor 70 are each individual integrated circuit chips.

The command preprocessor 30 is coupled for communication over the host bus 28. The command preprocessor 30 performs DMA reads of the geometry data arrays from the memory subsystem 22 over the host bus 28. The host processor 20 transfers virtual memory pointers to the command preprocessor 30. The virtual memory pointers point to the geometry data arrays in the memory subsystem 22. The command preprocessor 30 converts the virtual memory pointers to physical memory addresses for performing the DMA reads to the memory subsystem 22 without intervention from the host processor 20.

The command preprocessor 30 implements two data pipelines; a 3D geometry pipeline, and a direct port pipeline.

In the direct port pipeline, the command preprocessor 30 receives direct port data over the host bus 28, and transfers the direct port data over a command-to-draw bus (CD-BUS) 80 to the draw processors 50-54 as direct port packets. The direct port data is optionally processed by the command preprocessor 30 to perform X11 functions such as character writes, screen scrolls, and block moves in concert with the draw processors 50-54. The direct port data may also include register writes to the draw processors 50-54, and individual pixel writes to the frame buffer 100.

In the 3D geometry pipeline, the command preprocessor 30 accesses a stream of input vertex packets from the geometry data arrays, reorders the information contained within the input vertex packets, and optionally deletes information in the input vertex packets. The command preprocessor 30 reorders the information from the input vertex packet into reformatted vertex packets having a standardized element order. The command preprocessor 30 then transfers output geometry packets over a command-to-floating-point bus (CF-BUS) 82 to one of the floating-point processors 40-43. The output geometry packets comprise the reformatted vertex packets with optional modifications and data substitutions.

The command preprocessor 30 converts the information in each input vertex packet from differing number formats into the 32 bit IEEE floating-point number format. The command preprocessor 30 converts 8 bit fixed-point numbers, 16 bit fixed-point numbers, and 32 bit or 64 bit IEEE floating-point numbers.

The command preprocessor 30 either reformats or inserts header fields, inserts constants, and generates and inserts sequential pick-id's, and optionally inserts constant sequential pick-id's. The command preprocessor 30 examines the chaining bits of the header and reassembles the information from the input vertex packets into the reformatted vertex packets containing completely isolated geometry primitives including points, lines and triangles.

The command preprocessor 30 receives control and status signals from the floating-point processors 40-43 over a control portion of the CF_BUS 82. The control and status signals indicate the availability of input buffers within the floating-point processors 40-43 for receiving the output geometry packets.

The floating-point processors 40-43 are each substantially similar. Each floating-point processor 40-43 implements a 32 bit micro-code driven floating-point core, along with parallel input and output packet communication hardware. Each of the floating-point processors 40-43 implements floating-point functions including multiply, ALU, reciprocal, reciprocal-square-root and integer operations. Each floating-point processor 40-43 implements a wide assortment of specialized graphics instructions and features. Each floating-point processor 4043 is optimized to implement the number of fast internal registers required to perform the largest common three dimensional graphics processing micro-code inner loop implemented by the graphics accelerator 24.

For one embodiment, each floating-point processor 40-43 is implemented on a single integrated circuit chip. The only support chips required for each floating-point processor 40-43 is a set of four external SRAM chips that provide an external micro-code in a control store (CS).

Each floating-point processor 40-43 implements a function for setting up triangles for scan conversion by the draw processors 50-54. The first step of the setup function sorts the three vertices of a triangle in ascending y order. Each floating-point processors 40-43 broadcasts draw packets to all of the draw processors 50-54 over the CD-BUS 80. The draw packets contain final geometry primitives, including triangles, points and lines.

The draw processors 50-54 function as VRAM control chips for the frame buffer 100. The draw processors 50-54 concurrently render an image into the frame buffer 100 according to a draw packet received from one of the floating-point processors 40-43 or according to a direct port packet received from the command preprocessor 30.

Each draw processor 50-54 performs the scan conversion functions of edgewalking function and scan interpolation. The replication of the edgewalking and scan interpolation functions among the draw processors 50-54 obviates the need for large scale communication pathways between separate edgewalking and scan interpolation processors, thereby minimizing the pin counts of each of the draw processors 50-54 and decreasing printed circuit board space requirements.

The frame buffer 100 is arranged as a set of 5 VRAM interleave banks. The draw processor 50 writes pixel data into an interleave bank_0 61, the draw processor 51 writes pixel data into an interleave bank_1 62, the draw processor 52 writes pixel data into an interleave bank_2 63, the draw processor 53 writes pixel data into an interleave bank_3 64, the draw processor 54 writes pixel data into an interleave bank_4 65.

Each draw processor 50-54 renders only the pixels visible within the corresponding interleave bank 61-65. The draw processors 50-54 concurrently render the triangle primitive defined by an draw packet to produce the correct combined rasterized image in the frame buffer 100. Each draw processor 50-54 rasterizes every fifth pixel along each scan line of the final rasterized image. Each draw processor 50-54 starts a scan line biased by 0, 1, 2, 3, or 4 pixel spaces to the right.

Each draw processor 50-54 optionally performs depth cueing. Each pixel of a triangle, vector or dot rendered may be depth cued within the draw processors 50-54 without the performance penalty of prior graphics systems that perform depth cueing in floating-point processors. Each draw processor 50-54 optionally performs rectangular window clipping, blending and other pixel processing functions.

The post-processor 70 receives interleaved pixel data from the frame buffer 100 over the video bus 84. The post-processor 70 performs color look-up table and cursor functions. The RAMDAC 72 converts the pixel data received from the post-processor 70 into video signals 73 for the display device 26.

Figure 3:
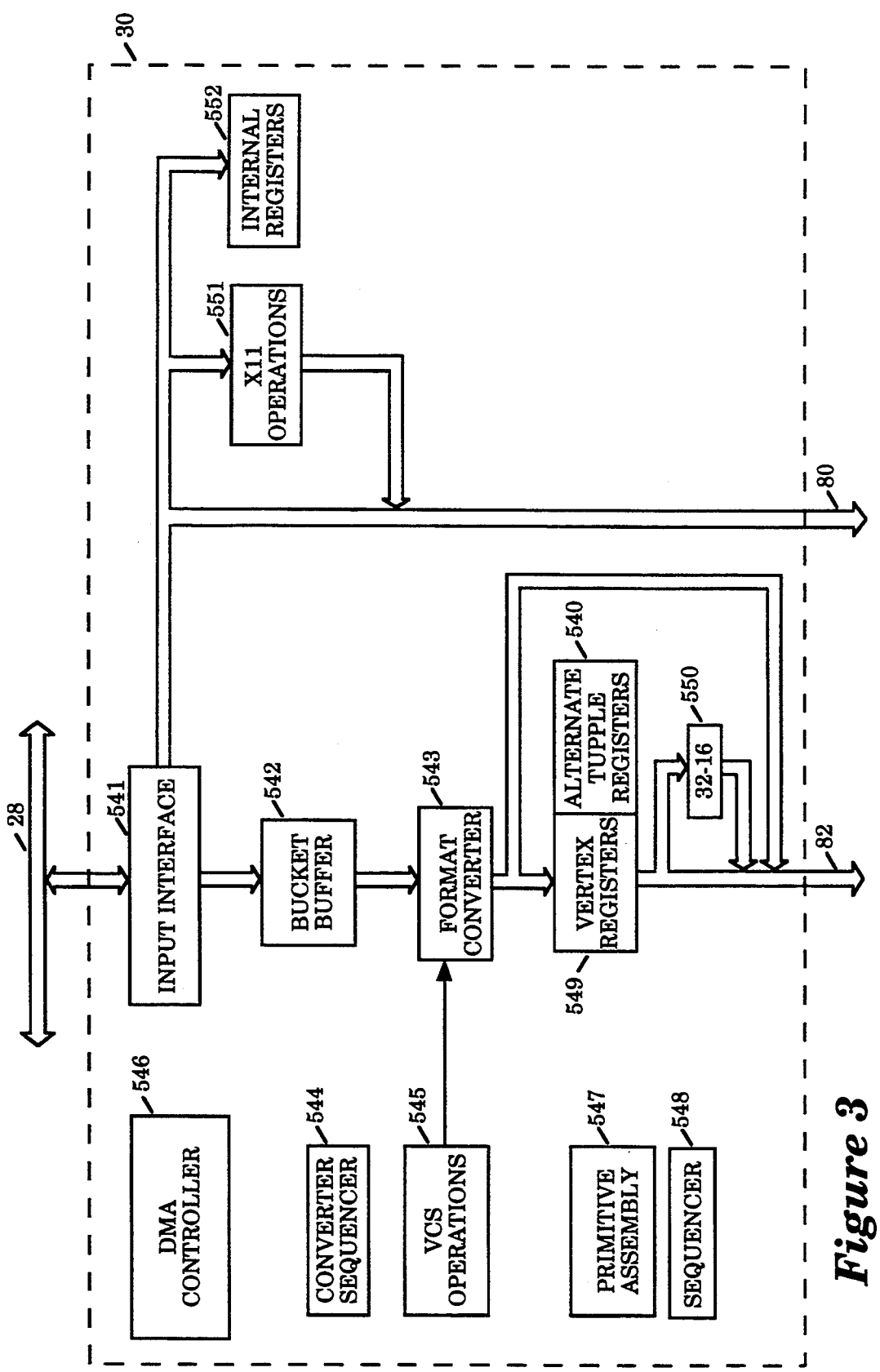
FIG. 3 is a block diagram of the command preprocessor which shows the reformatting circuitry of the 3D geometry pipeline, along with the direct port data pipeline.

FIG. 3 is a block diagram of the command preprocessor 30. The command preprocessor 30 is shown coupled to the host bus 28 for communication through the 3D geometry pipeline and the direct port pipeline. For one embodiment, the command preprocessor 30 is implemented on a single integrated circuit chip.

The direct port pipeline comprises an input interface 541 and an X11 operations circuit 551. The input interface 541 receives direct port data over the host bus 28, and transfers the direct port data over the CD-BUS 80 to the draw processors 50-54. The direct port data includes register writes to the draw processors 50-54 and individual pixel writes to the frame buffer 100. The direct port data is optionally transferred to the X11 operations circuit 551 to perform X11 functions such as character writes, screen scrolls, and block moves in concert with the draw processors 50-54.

The 3D geometry pipeline comprises the input interface 541, a bucket buffer 542, a format converter 543, a vertex buffer comprising a set of vertex registers 549 and alternate tupple registers 540. Format conversion in the 3D geometry pipeline is controlled by a VCS operations circuit 545 and a converter sequencer 544. Output geometry packets are assembled by a primitive assembly circuit 547 and a sequencer 548. A 32-16 circuit 550 optionally performs data compression. A set of internal registers 552 are programmed over the host bus 28 to control the operations of the 3D geometry pipeline and the direct port pipeline. A DMA controller 546 performs DMA transfers into the bucket buffer 542 over the host bus 28.

The input interface 541 contains a burst buffer for interfacing between the differing clocking environments of the host bus 28 and the command preprocessor 30. The burst buffer functions as a set of temporary holding registers for input vertex packets transferred into the bucket buffer 542.

The format converter circuit 543 accesses the input vertex packets from the bucket buffer 542, and assembles the reformatted vertex packets into the vertex registers 549. The format converter circuit 543 is controlled by the VCS operations circuit 545 according to preprogrammed format conversion operations. The format conversion is sequenced by the converter sequencer 544.

The primitive assembly circuit 547 under control of the sequencer 548 accesses the reformatted vertex packets from the vertex registers 549, and transfers the output geometry packets over the CF-BUS 82. The primitive assembly circuit 547 optionally substitutes alternate tupples from the alternate tupple registers 540. The primitive assembly circuit 547 also optionally performs data compression on data in the output geometry packets using the 32-16 circuit 550.

The format converter 543 processes input vertex packets that define a triangle strip. Header bits in each input vertex packet specify a replacement type. The replacement type defines the combination of a subsequent input vertex packet with previous input vertex packets to form a next triangle in the triangle strip. The format converter 543 implements a register stack that holds the last three vertices in the triangle strip. The format converter 543 labels the last three vertices in the triangle strip as the oldest, the middlest, and the newest.

A triangle strip with a "zig-zag" pattern corresponds to a new input vertex packet having a header that specifies the replacement type replace_oldest. The replacement type replace_oldest causes the format converter 543 to replace the oldest vertex by the middlest, and to replace the middlest vertex by the newest, and to set the newest vertex to the vertex in the new input vertex packet. The foregoing pattern corresponds to a PHIGS_PLUS simple triangle strip.

A triangle strip with a "star" pattern corresponds to a new input vertex packet having a header that specifies the replacement type replace_middlest. The replacement type replace_middlest causes the format converter 543 to leave the oldest vertex unchanged, to replace the middlest vertex by the newest vertex, and to set the newest vertex to the vertex in the new input vertex packet.

To begin a generalized triangle strip, a new input vertex packet has a header that specifies the replacement type restart. The replacement type restart causes the format converter 543 to mark the oldest and the middlest vertices as invalid, and to set the newest vertex to the vertex in the new input vertex packet.

The primitive assembly circuit 547 transfers an output geometry packet for a triangle from the vertex registers 549 and alternate tupple registers 540 over the CF-BUS 82 whenever a replacement operation generates three valid vertices in the vertex registers 549.

The restart replacement type in the header of a input vertex packet corresponds to a move operation for polylines. The restart replacement type enables a single data structure, the geometry data array in the memory subsystem 22, to specify multiple unconnected variable length triangle strips. Such a capability reduces the overhead required for starting a DMA sequence over the host bus 28.

The replacement types in the input vertex packets received by the command preprocessor 30 from the geometry data array in the memory subsystem enables a triangle strip to change from a "zig zag" pattern to a "star" pattern in the middle of the strip. Such a capability enables the representation of complex geometry in a compact data structure while requiring minimal input data bandwidth over the host bus 28.

The format converter 543 rearranges the vertex order in the vertex registers 549 after every replace_oldest replacement type to normalize the facing of the output triangles in the reformatted vertex packets. The primitive assembly circuit 547 rearranges the vertex order as the vertex is transferred out of the vertex registers 549 such that the front face of the output triangle is always defined by a clockwise vertex order.

A header bit in a input vertex packet specifies an initial face ordering of each triangle strip. In addition, the command preprocessor 30 contains a register with a state bit which causes reversal of the initial face ordering specified in the header. An application program executing on the host processor 20 maintains the state bit to reflect a model matrix maintained by the application program. Also, the command preprocessor 30 reverses the face ordering for every triangle in a "zig-zag" pattern.

The primitive assembly circuit 547 transfers each reformatted vertex packet from the vertex registers 549 to a next available floating-point processor 40-43. The next available floating-point processor 40-43 is determined by sensing input buffer status of each floating-point processor 40-43 over a control portion of the CF-BUS 82.

The command preprocessor 30 maintains a record or "scoreboard" of the ordering of transfer of each output geometry packet to the floating-point processors 40-43. The command preprocessor 30 controls the output buffers of the floating-point processors 40-43 by transferring control signals over a control portion of the CD-BUS 80. The command preprocessor 30 ensures that the output geometry packets are processed through the floating-point processors 40-43 in the proper order when a sequential rendering order is required. If sequential rendering is not required, then the first draw packet at the output of the floating-point processors 40-43 is rendered first.

The format converter 543 also reformats polylines and poly-polylines. In addition, the format converter 543 optionally converts triangle strip data into polyline edges. Such a capability reduces the complexity of the micro-code for the floating-point processors 40-43 because triangle processing is not mixed with line processing during operations that require triangle edge highlighting.

To process edge highlighting of triangles within a triangle strip, the command preprocessor 30 assembles the input vertex packets for the triangle strip into reformatted vertex packets, and passes the reformatted vertex packets to the floating-point processors 40-43 over the CF-BUS 82 as output geometry packets. Thereafter, the command preprocessor 30 accesses the original triangle strip input vertex packets over the host bus 28, and assembles the input vertex packets into reformatted vertex packets containing isolated vectors representing highlighted edges. The command preprocessor 30 then processes the isolated vectors through the floating-point processors 40-43 and the draw processors 5054 to perform the highlighting function.

For one embodiment the data portion of the CF-BUS 82 is 16 bits wide, and the data portion of the CD-BUS 80 is 16 bits wide. The command preprocessor 30 optionally compresses color and normal data components of the reformatted vertex packets using the 32-16 circuit 550 before transfer to the floating-point processors 40–43 over the CF-BUS 82 as output geometry packets. The 32-16 circuit 550 compresses the color and normal data from 32 bit IEEE floating-point format into 16 fixed-point format. Thereafter, the floating-point processors 40–43 receive the output geometry packets with the compressed color and normal data components, and decompress the color and normal components back into 32 bit IEEE floating-point values.

The compression of color and normal data components of the reformatted vertex packets does not substantially affect the ultimate image quality for the graphics accelerator 24 because the color components of the reformatted vertex packets are represented as eight bit values in the frame buffer 100. Similarly, normal components of the output geometry packets having a 16 bit unsigned accuracy represent a resolution of approximately plus or minus one inch at one mile. On the other hand, the data compression of color and normal components of the reformatted vertex packets reduces the data transfer bandwidth over the CF-BUS 82 by approximately 25 percent.

Figure 4:
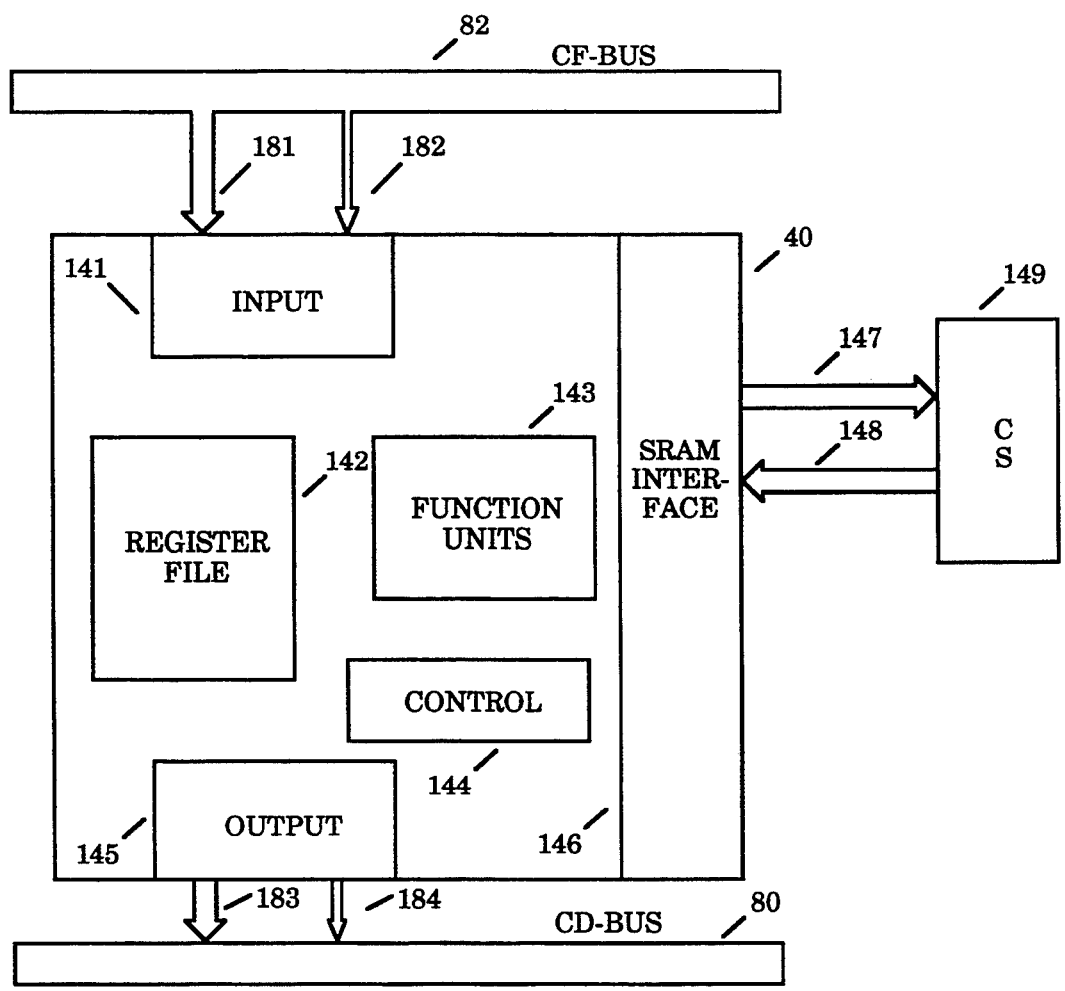
FIG. 4 is a block diagram of a floating-point processor section, including a control store (CS), an input circuit, an output circuit, a register file, a set of functional units, a control circuit, and an SRAM interface circuit.

FIG. 4 is a block diagram of the floating-point processor section 45, which includes the floating-point processor 40 and a control store (CS) 149. The floating-point processor 40 is comprised of an input circuit 141, an output circuit 145, a register file 142, a set of functional units 143, a control circuit 144, and a SRAM interface circuit 146. The floating-point processor 40 implements an internal subroutine stack and block load/store instructions for transfers to the CS 149, as well as integer functions.

The floating-point processor 40 receives the output geometry packets over a data portion 181 of the CF-BUS 82. The command preprocessor 30 transfers control signals over a control portion 182 of the CF-BUS 82 to enable and disable the input buffer 141.

The function units 143 implement a floating-point multiplier, a floating-point ALU, a floating-point reciprocal operation, a reciprocal square-root operation, and an integer ALU. The output circuit 145 transfers draw packets over a data portion 183 of the CD-BUS 80. The output circuit 145 also transfers control signals over a control portion 184 of the CD-BUS 80 to synchronize data transfer to the draw processors 50–54 and to coordinate bus activity on the CD-BUS 80 with the command preprocessor 30.

For one embodiment, the input circuit 141 and the output circuit 145 each contain 64 registers for buffering geometry data. The register file 142 is comprised of one hundred and sixty 32 bit registers.

The SRAM interface 146 communicates with a control store (CS) 149 over a control store address bus 147 in a control store data bus 148. For one embodiment the control store address bus 147 is 17 bits wide and the control store data bus 148 is 32 bits wide. The control store 149 is comprised of four 128k by eight bit SRAMs.

The registers contained in the input circuit 141 are arranged as a pair of 32 register files in a double buffered fashion. Similarly, the registers contained in the output circuit 145 are arranged as a pair of 32 register double buffered register files. The micro-code executing on the floating-point processor 40 accesses the registers of the input circuit 141 and the output circuit 145 as special register files. The instruction set for the floating-point processors 40 includes commands for requesting and for relinquishing the register files, as well as commands for queuing for transmission completed data packets over the CD-BUS 80.

The floating-point processors 40 implements the triangle setup function for scan conversion by the draw processors 50–54. The first stage of the triangle setup function sorts the three vertices of a triangle in ascending y order. The floating-point processor 40 implements a special instruction that reorders a section of a register file 142 in hardware based upon the results of the last three comparisons of the y coordinates of the vertices.

A clip testing function implemented in the floating-point processors 40 computes a vector of clip condition bits. The floating-point processor 40–43 implements a special clip test instruction that computes pairs of the clip condition bits, while shifting the clip condition bits into a special clip register. After the clip condition bits have been computed, special branch instructions decode the clip condition bits contained in the clip register into the appropriate clip condition. The floating-point processor 40 implements separate branch instructions for clipping triangles and vectors. The special branch instructions enable testing of multiple clip conditions within the same instruction.

Figure 5:
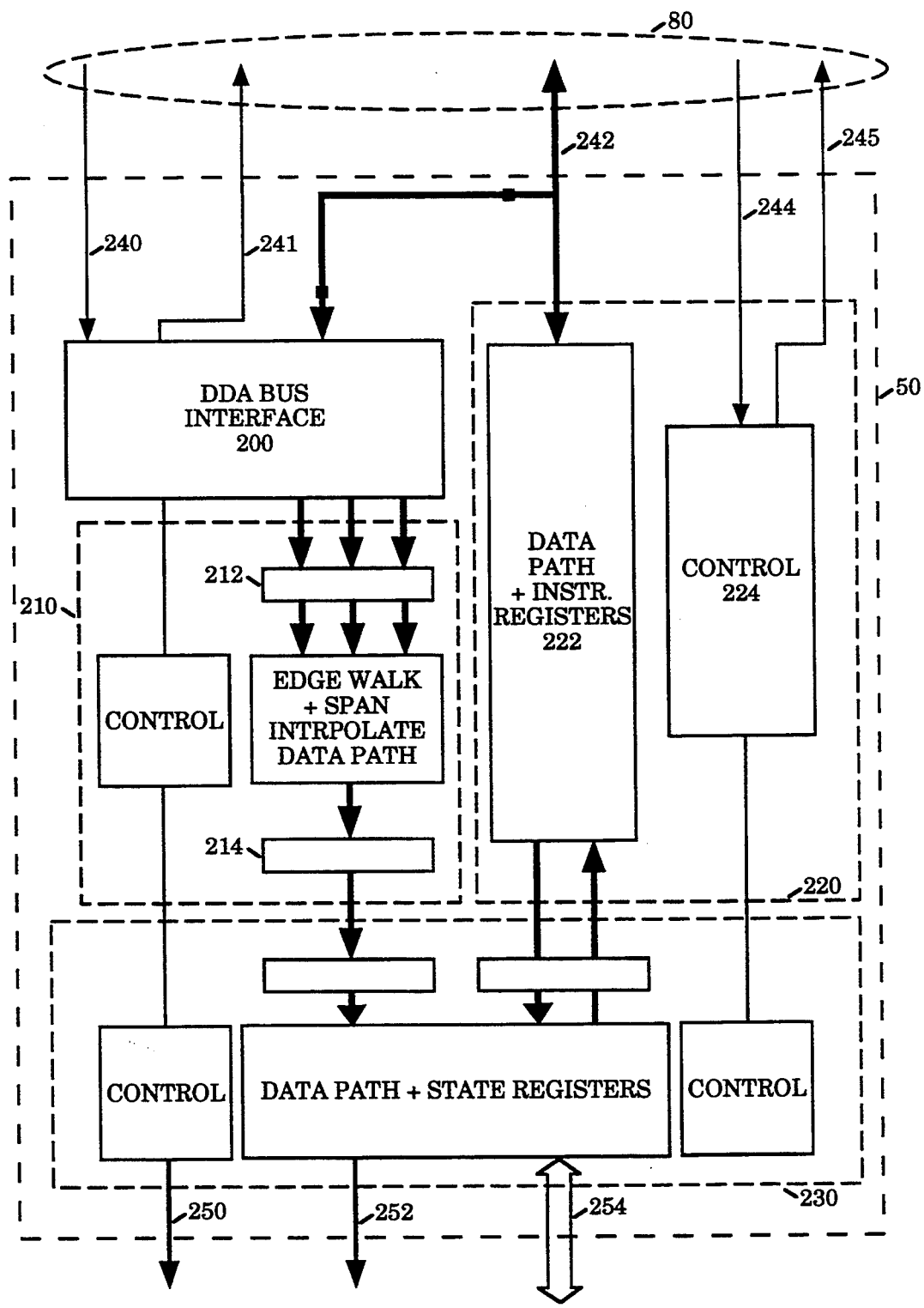
FIG. 5 is a block diagram of the draw processor which shows a 3D geometry pipeline interface circuit, a rendering circuit, a direct port bus interface circuit, and a memory control circuit.

FIG. 5 is a block diagram of the draw processor 50. The draw processor 50 is comprised of a 3D geometry pipeline interface circuit 200, a rendering circuit 210, a direct port bus interface circuit 220, and a memory control circuit 230. The draw processors 51–54 are each substantially similar to the draw processor 50.

The rendering circuit 210 implements a high accuracy digital differential analyzer (DDA) algorithm that enables sub-pixel accuracy using thirty two bit internal processing units. Aliased and anti-aliased lines and dots are rendered in the distributed manner previously described, wherein the draw processor 50 processes every fifth pixel along a scan line.

The draw processor 50 also implements the rendering portions of the X11 operations in coordination with the X11 operations circuit of the command preprocessor 30. The X11 operations include reading and writing of groups of pixels for vertical scrolls, raster operations and stencil operations.

The 3D geometry pipeline interface circuit 200 provides a double buffered arrangement for receiving output geometry packets over a data portion 242 of the CD-BUS 80. The 3D geometry pipeline interface circuit 200 also transfers control signals over a draw load signal line 240 and a draw buffer available signal line 241 to coordinate data transfer with the command preprocessor 30 and the floating-point processors 40–43. The 3D geometry pipeline interface circuit 200 is arranged such that new geometry data is loaded over the CD-BUS 80 while old geometry data is being rendered by the rendering circuit 210.

The rendering circuit 210 performs the edgewalking function in one single pixel cycle time in order to prevent slowing of the scan conversion function. The high speed of the edgewalking function is provided because the edgewalking circuit must advance to a next scan line up to five times more often than would be required of a single external edgewalking chip. The rendering circuit 210 performs rasterization algorithms for triangles, anti-aliased vectors, aliased vectors, anti-aliased dots, and aliased data.

The memory control circuit 230 generates addresses over a frame buffer address bus 252 and control signals over a frame buffer control bus 250 to transfer pixel data over a frame buffer data bus 254 to the interleave bank_0 61.

The 3D geometry pipeline interface circuit 200 receives draw packets over the CD_BUS 80. The command type is encoded in the first word of each draw packet. The command type determines the sequence and format of each word in the draw packet. The 3D geometry pipeline interface circuit 200 routes each word of a draw packet data into an appropriate internal double buffer register. After a complete draw packet is assembled in the double buffer registers, the 3D geometry pipeline interface circuit 200 initiates a handshake sequence to load the command words from the draw packet into a set of current buffer registers 212 in the rendering circuit 210.

The 3D geometry pipeline interface circuit 200 contains circuitry for adjusting all X coordinates of the draw packet according to a draw processor interleave value assigned to the draw processor 50.

The direct port bus interface circuit 220 receives direct port packets over the CD-BUS 80. The direct port bus interface circuit 220 controls the execution of direct port commands. The direct port bus interface circuit 220 also controls the direct port handshake with the command preprocessor 30 according to a direct port strobe signal 244 and a direct port buffer available signal 245. The direct port bus interface circuit 220 assembles the direct port command and controls a handshake sequence that causes the necessary frame buffer access by the memory control circuit 230. Read data destined for the command preprocessor 30 is placed in the a read buffer in the direct port bus interface circuit 220, which is read by the command preprocessor 30 over the CD-BUS 80.

The rendering circuit 210 performs edge walking and span interpolation functions for triangles, performs a simple DDA function for vectors, and performs a pass operation for dots. The rendering circuit 210 also performs end point correction, antialiasing alpha calculation, and computation of depth cue scale factors. The rendering circuit 210 generates (x,y), (r,g,b,z), and (alpha) values for each pixel rendered to the interleave bank_0 61.

The rendering circuit 210 stores the (x,y), (r,g,b,z), and (alpha) values into a set of double buffer registers 214. The rendering circuit 210 then controls a handshake sequence to load the values into an appropriate set of double buffer registers in the memory control circuit 230.

The memory control circuit 230 receives requests for frame buffer access from the rendering circuit 210, the direct port bus interface circuit 220, and video/DRAM refresh circuitry (not shown). The memory control circuit 230 arbitrates among the requests, and generates the necessary control signals to read/write pixels to the VRAM interleave bank_0.

The memory control circuit 230 also performs address and data related functions. The address related functions include address translation, viewport clipping and page mode access detection. The data related functions include blending and logical operations on data, z buffering, window ID checking, and screen door transparency, etc.

The memory control circuit 230 also includes a video refresh counter for transfer VRAM cycles. The memory control circuit 230 performs DRAM refresh using CAS before RAS cycles.

Figure 6:
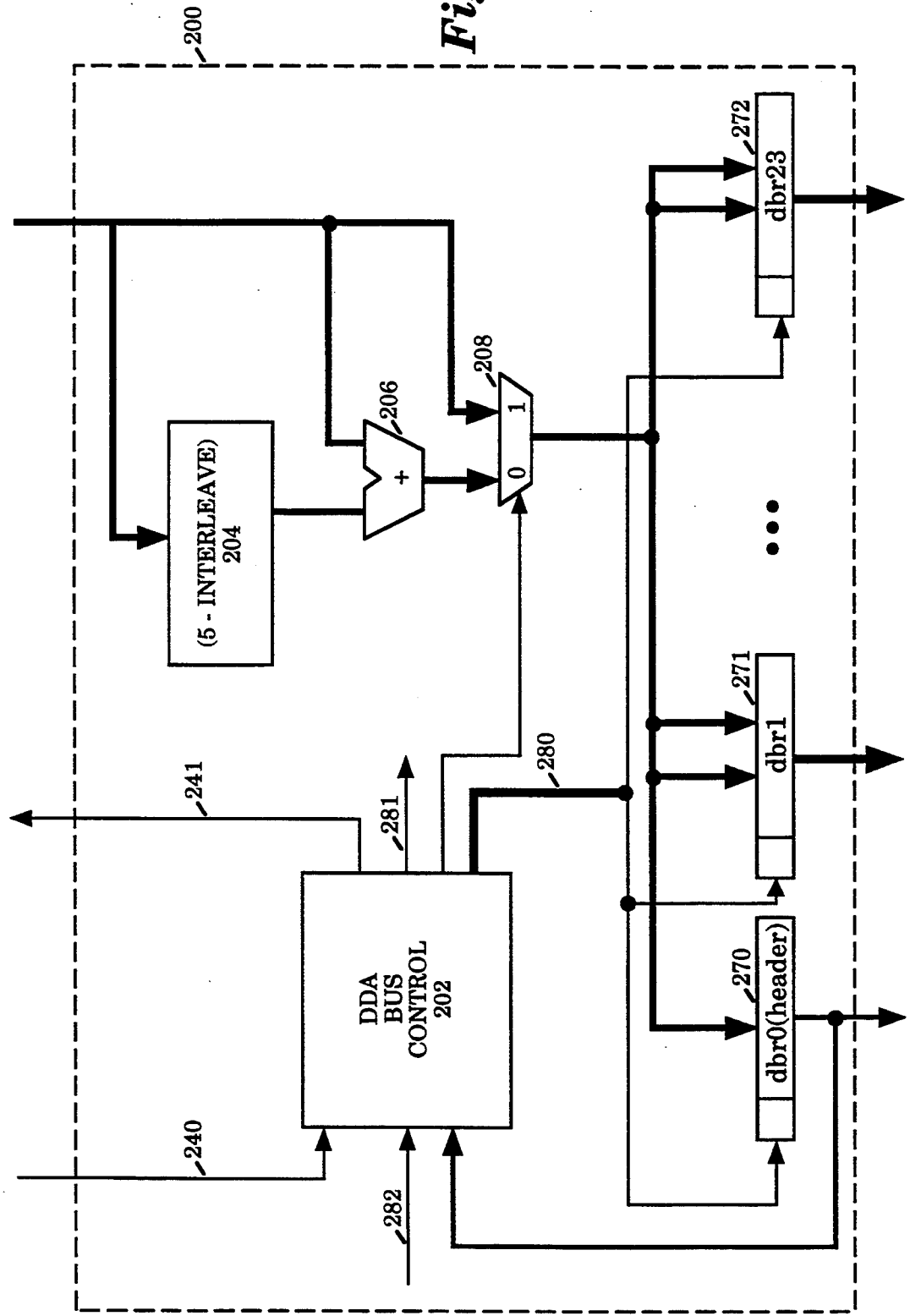
FIG. 6 illustrates the 3D geometry pipeline interface circuit which receives output geometry packets for the 3D geometry pipeline over the CD_BUS.

FIG. 6 illustrates the 3D geometry pipeline interface circuit 200. The 3D geometry pipeline interface circuit 200 receives draw packets for the 3D geometry pipeline over the CD_BUS 80. The 3D geometry pipeline interface circuit 200 unpacks the draw packets into a set of double buffer registers 270 272. The double buffer registers 270-272 comprise 24 double buffer registers (dbr0-dbr23). The 3D geometry pipeline interface circuit 200 comprises a DDA bus control circuit 202, and a DDA data path circuit comprising a draw interleave circuit 204, an adder 206, and a multiplexer 208.

The adder 206 adjusts all x coordinates in the draw packets according to the draw processor interleave value assigned to the draw processor 50. The adder 206 receives draw packets for the 3D geometry pipeline over the CD_BUS 80. The draw interleave circuit 204 contains an interleave register that stores a draw processor interleave value assigned to the draw processor 50. The draw interleave circuit 204 generates a value equal to five minus the draw processor interleave value stored in the interleave register. The adder 206 adds the value generated by the draw interleave circuit 204 to all x coordinates in the draw packets before transfer to the double buffer registers 270-272.

The DDA bus control circuit 202 generates a set of control signals 280 to load the draw packets into the double buffer registers 270-272. The first word (header) of each draw packet identifies the packet type, the format of the packet, the length of the packet. The DDA bus control circuit 202 loads the header into the first double buffer register (dbr0). Based on the header information, the DDA bus control circuit 202 loads the remainder of the double buffer registers (dbr1-dbr23).

FIG. 7 lists the format of the 3D geometry pipeline commands contained in draw packets. The double buffer register (dbr1-dbr23) employed for each parameter in the commands packet is also shown.

The DDA bus control circuit 202 handshakes with the DDA circuit 210 to ensure that the commands are transferred to the current buffer registers 212 in an orderly fashion. The DDA bus control circuit 202 generates a load current buffer signal 281 to simultaneously transfer the contents of the double buffer registers 270-272 to the corresponding current buffer registers 212. The DDA bus control circuit 202 then asserts the draw buffer available signal 241 to enable transfer of another output geometry packet into the double buffer registers 270-272. A DDA ready signal 282 is received from the DDA circuit 210 after the last command is completed.

The direct port bus interface circuit 220 in conjunction with the memory control circuit 230 executes the commands received through the direct port pipeline over the CD-BUS 80. The direct port bus interface circuit 220 comprises a data path circuit 222 and a control circuit 224.

The data path circuit 222 routes 'y' and 'x' addresses received over the CD-BUS 80 into the memory control circuit 230. For example, the data path circuit 222 routes 'y' and 'x' addresses from the CD-BUS 80 to the memory control circuit 230 during pixel read/write direct port commands. During block copy, vertical scroll, and fill direct port commands, the pixel address is generated by the draw processor 50 as described below.

The data path circuit 222 contains a set of instr source registers and instr destination registers. The instr source registers and instr destination registers are employed during the Blt, the vertical scroll, and the fill category direct port commands. The instr source registers comprise an 'xs' and a 'ys,' and the instr destination registers comprise an 'xd' a 'yd' and a 'countd' register. The xs, xd, ys, and yd registers are auto-increment or auto decrement as specified by a corresponding direction bit.

During the read-X-write Blt direct port command, the draw processor 50 performs a read access of the frame buffer 100 at (xs, ys) and then performs a write access at (xd, yd).

During a stencil operation through the direct port pipeline, the data path circuit 222 extracts a single bit from the data field according to the corresponding interleave number for the draw processor 50. The data path circuit 222 then adds the extracted bit to the mask bit.

The data path circuit 222 also performs data formatting for pixel 'byte write' access mode and the byte mode block copy direct port command. The data path circuit 222 also contains a double buffered write buffer for block copy direct port operations, and contains logic for byte extraction during byte mode block copy direct port operations.

The control circuit 224 decomposes the incoming direct port packets into pixel read, pixel write, and load register instructions for the memory control circuit 230. The control circuit 224 also implements a handshake sequence with the command preprocessor 30 to transfer direct port commands/data between the command preprocessor 30 and the draw processor 50.

A pixel write direct port command writes data to one of the three plane groups: image, depth, or window. The pixel-write operation is performed according to either a state register set 0 or a state register set 1 as specified by a state set bit in the direct port packet header. Similarly, a pixel read direct port command reads data to one of the three plane groups: image, depth, or window. The pixel read operation is performed according to either the state register set 0 or the state register set 1 as specified by a state set bit in the direct port packet header.

During a stencil write direct port operation, the command preprocessor 30 extracts the data and mask bits from the appropriate bits in the direct port input packet. If the mask bit is '0', then the pixel is not modified. If the mask bit is 1, then the pixel is written with the foreground color. If the draw processor 50 is in OR mode and the mask bit is 0, then the pixel is unmodified. If the draw processor 50 is in AND mode and the mask bit is 0, then the pixel is written with the background color. The stencil operation is performed according to the state register set 0.

The fill direct port command causes the draw processor 50 to transfer of up to 4 pixels starting at (xd, yd) to the frame buffer 100. The data source for the fill direct port command is a stencil/fill foreground register. The frame buffer 100 is accessed with one random and three page mode read-modify-write cycles.

Direct port block copy operations are performed with separate instructions: the blt_Read, blt_read_transmit, and the bit-write-transmit-read instructions. In byte mode, four pixels are read, written and transmitted with each command, otherwise, one pixel is read, written and transmitted with each command.

The blt-read direct port instruction causes the draw processor 50 to read a pixel from (xs,ys) and store the pixel in a block copy read buffer. The xs register is then incremented and the x-source-size register is decremented.

The bit-read-transmit direct port instruction causes the draw processor 50 to read a pixel from (xs,ys) and store the pixel in a block copy read double buffer. The command preprocessor 30 reads the pixel from the block copy read buffer. Thereafter, the pixel data is moved from the read double buffer to the read buffer. The xs register is then incremented and the size register is decremented.

The bit-write-transmit-read direct port instruction causes the draw processor 50 to copy the data from the write buffer into the write double buffer, and then write the data to the frame buffer 100 at (xd, yd). The xd register is then incremented and the x-destination-size register is decremented. The draw processor 50 then reads a pixel from the frame buffer 100 at (xs,ys) and transfer the pixel to the block copy read double buffer. The command preprocessor 30 reads the pixel from the block copy read buffer. Thereafter, the pixel data is moved from the block copy read double buffer to the block copy read buffer. The xs register is then incremented and the size register is decremented.

The memory control circuit 230 section performs viewport clipping, logical ops, blending ops, alpha calculation, Z-Buffering, window clipping, screen door transparency, cursor plane access, picking, video refresh, DRAM refresh, fast clear plane management and VRAM control.

The memory control circuit 230 viewport clips memory accesses to the frame buffer 100 for both the 3D geometry pipeline and the direct port pipeline.

When a pick hit is detected, the draw processor 50 freezes the 3D geometry pipeline after rendering the primitive that caused the pick hit. The pick ID registers are preserved. The draw processor 50 asserts a draw processor interrupt to the command preprocessor 30 when pick hit is detected.

The host processor 20 programs a set of control registers in the draw processors 50. The control registers hold operating parameters for both the 3D geometry pipeline and the direct port pipeline. The command preprocessor 30 receives direct port data over the host bus 28 targeted for the control registers of the draw processor 50, and transfers the direct port data over CD-BUS 80 to the draw processor 50 as direct port packets.

The control registers contained in the draw processor 50 are separated into global and state set dependent registers for the direct port pipeline (state set 0) and the 3D geometry pipeline (state set 1 ). For some operations, a separate register is provided in both state set 0 and 1. The global registers have one register that serves both state sets and are accessible over both the direct port and the 3D geometry pipeline.

The host processor 28 broadcasts writes to all of the draw processors 50-54, and writes to the specific draw processor 50-54. The broadcast write is employed to program a constant attribute for all of the draw processors 50-54. The host processor 28 also reads the control registers of the draw processors 50-54.

The control registers for the draw processor 50 include a control and status register (CSR). The CSR is a read only register over the direct port. The bit fields for the CSR are as follows:

$D<7>$ = Reset 3D Geometry Port $D<6:4>$ = Number of PID'S—indicates the number of pick ID's in the draw processor pipeline.

$D<3>$ = Pick Hit—indicates that the draw processor 50 detected a pixel in the pick aperture. The Pick Hit field is reset by the command preprocessor 30 over the direct port.

D<2> =Semaphore—indicates that the draw processor 50 semaphore is set.

D<1> =Stall Acc—indicates that a Stall Accelerator signal was received from the command preprocessor 30.

D<0> =Acc Stalled—indicates that an Accelerator Stalled signal is being sent to the command preprocessor 30.

The control registers for the draw processor 50 include the draw processor interleave register which specifies the draw processor interleave value. The draw processor interleave value identifies the draw processor 50 and is in the range of 0 to 4.

A write to a semaphore register sets a draw processor semaphore and sets bit 2 of the CSR. The draw processor 50 does not execute 3D geometry pipeline commands while the semaphore bit is set. The draw processor semaphore register is strobed over both the 3D geometry pipeline and the direct port pipeline. A write to a clear semaphore register clears the draw processor semaphore and clears bit 2 of the CSR. The draw processor semaphore register is strobed over the direct port pipeline.

A write to a set stall register sets bit 1 of the CSR. The draw processor 50 does not execute any 3D geometry pipeline commands while bit 1 of the CSR is set. The command preprocessor 30 uses bit 1 of the CSR to lock out the 3D geometry pipeline during execution of Blt or fill direct port operations. A write to a clear stall register clears bit 1 of the CSR to enable the draw processor 50 to resume updates of the frame buffer 100.

A write to a reset geometry port register resets the 3D geometry pipeline to the draw processor 50 by setting bit 7 of the CSR (reset), and by resetting bit 3 (pick hit), bit 2 (semaphore), and bit 0 (stall). A write to a clear geometry port reset register clears 3D geometry pipeline reset condition and clears bit 7 of the CSR.

A frame buffer width register selects the maximum horizontal resolution of the frame buffer 100, and enables stereo addressing mode.

A draw processor attribute register controls several functions of the draw processor 50. For a blend operation (bits 24 and 23) or raster operations (ROP) (bits 21 through 18), the state set 0 specifies the current ROP. The current ROP only affects the RGBO planes, depending on the current access mode plane group selected by the plane group enable field (bits 11 through 5). The state set 1 specifies the current boolean ROP and enables the blend circuitry. The current ROP affects the RGBO, the cursor data, and the cursor enable planes. The current blend operation affects the RGB planes.

The bit fields of the draw processor attribute register are defined below, wherein SRC is the source data, DST is the data at frame buffer destination, BG is the background, and DDA is digital differential analyzer:

D<31:29> =Pick Control
1xx Enable picking
x1x Render while picking
xx1 3-D Pick Aperture
The codes enable the following functions:
0xx Disable picking
100 2-D Bound Pick without Render
101 3-D Bound Pick without Render
110 2-D Bound Pick while Render
111 3-D Bound Pick while Render The 2D pick uses X and Y bounds. The 3D pick uses X, Y, and Z bounds.

D<28> =Depth Cue Enable

D<27> =Screen Door Enable enables the screen door transparency function:
0 Solid-draw all pixels
1 Transparent--use screen door pattern D<26> =Force Color Enable
SRC=DDA color
1 SRC=Color register D<25> =Antialias Enable
0 Constant alpha
1 Antialias filter alpha D<24> =Blend Function Select
0 Blend to background: (SRC−BG)*alpha+DST
1 Blend to frame buffer: (SRC−DST)*alpha+DST D<23> =Blend Enable
0 Perform a raster operation as specified by ROP Code in bits 21–18.
1 Perform a blend operation as specified by Antialias Enable in bit 25 and Blend Function Select in bit 24.

D<22> =BLT Source Buffer B
0 Disable Buffer B (enable Buffer A)
1 Enable Buffer B (disable Buffer A)

D<21:18> =ROP Code selects a boolean ROP (raster operation) as follows (codes are hexidecimal)
0 DST+all bits zero
1 DST= ~(SRC or DST)
2 DST= ~SRC and DST
3 DST= ~SRC
4 DST=SRC and ~DST
5 DST= ~DST
6 DST=SRC xor DST
7 DST= ~(SRC and DST)
8 DST=SRC and DST
9 DST= ~SRC xor DST
10 A DST=DST
11 B DST= ~SRC or DST
12 C DST=SRC; this is the default case when not doing a rop operation
D DST=SRC or ~DST
E DST=SRC or DST
F DST=all bits one D<17:14> =Z-Buffering Control—controls the use of the depth planes as follows
1xxx HSR (Hidden Surface Removal) enable
x1xx Z write enable
xx1x Constant Z enable
xxx1 WID extension clip enable FIG. 8 shows the coding of the Z-Buffering control field for hidden surface removal (HSR) functions using Z as a depth buffer. FIG. 9 shows the coding of the Z-Buffering control field for window ID (WID) functions using Z as a window ID extension.

D<13:12> =Stereo Control: Bit 12 defines the current window application as stereo (1) or "mono" (0). Bit 13 specifies the desired half of the frame buffer (0 for left or 1 for right).
x0 Mono
x1 Stereo
0x Left
1x Right D<11:5> =Plane Group Enable—enables and disables individual plane groups. A pixel in a particular plane is updated only if that plane group is enabled and the write mask is "1". The function is modified for fast clear windows. Each bit (0=disable, 1=enable) controls a specific plane as follows:

Bit 11 Window ID group enable
Bit 10 Fast Clear operation enable (see bits 3:1)
Bit 9 Red plane enable
Bit 8 Green plane enable
Bit 7 Blue plane enable
Bit 6 Overlay plane enable
Bit 5 Z plane enable
　　D<4>=Force Current WID:
0 Do not force Current Window ID.
1 The contents of the Current Window ID plane replaces the contents of the frame buffer on every write. The final write to the WID planes is controlled by the plane mask and the window plane group enable bit.
　　D<3:1>=Fast Clear Plane Select—identifies fast clear planes for the current window
0 Fast Clear Plane 0
1 Fast Clear Plane 1
2 Fast Clear Plane 2
3 Fast Clear Plane 3
4 Fast Clear Plane 4
5 Fast Clear Plane 5
6 Fast Clear Plane 6
7 Fast Clear Plane 7
　　D<0>=Buffer B Select—provides double buffer control for the RGB planes. Buffer B Select is set to 1 to select Buffer B as the target for all read, write and read-modify-write accesses of the frame buffer 100. For the Block Copy operation, bit 22 (Blt Source Buffer B) provides an independent selection of the source buffer to enable block copy operations between Buffer A and Buffer B. Buffer B Select is coded as follows:
0 Select buffer A; if bit 22 is set, select buffer B as source.
1 Select buffer B; if bit 22 is clear, select buffer A as source.

A stencil/fill foreground color register specifies the frame buffer pixel data during a stencil mode access. The stencil bits that are set to 1 use the foreground color. During a fill operation, the data in the stencil/fill foreground color register is written to the frame buffer 100 for every pixel. The format of the data in the stencil/fill foreground color register depends on the selected plane group as shown above. For image planes, the bit fields of the stencil/fill foreground color register are as follows:
D<31:24>=Overlay—specifies the overlay pixel value.
D<23:16>=Blue—specifies the blue pixel value.
D<15:8>=Green—specifies the green pixel value.
D<7:0>=Red—specifies the red pixel value.
For depth planes, the bit fields of the stencil/fill foreground color register are as follows:
D<23:0>=Depth—specifies the depth (Z) of the pixel.
For window planes, the bit fields of the stencil/fill foreground color register are as follows:
D<15:0>=Fast Clear—each bit specifies a fast clear plane: bit 10 specifies plane 0, bit 11 specifies plane 1, and so forth.
D<9:6>=Overlay Window ID Planes—specifies the Overlay Window ID plane.
D<5:0>=Image Window ID Planes—specifies the Image Window ID plane.

A stencil background color register specifies the frame buffer pixel data during a stencil mode access. The stencil bits set to 0 user the background color if the transparency flag is 0. For image planes, the bit fields of stencil background color register are as follows:
D<31:24>=Overlay—specifies the overlay pixel value.
D<23:16>=Blue—specifies the blue pixel value.
D<15:8>=Green—specifies the green pixel value.
D<7:0>=Red—specifies the red pixel value.
For depth planes, the bit fields of stencil background color register are as follows:
D<23:0>=Depth—specifies the depth (Z) of the pixel.
For window planes, the bit fields of stencil background color register are as follows:
D<15:0>=Fast Clear—specifies the fast clear plane.
D<9:6>=Overlay Window ID Planes—specifies the Overlay Window ID plane.
D<5:0>=Image Window ID Planes—specifies the Image Window ID plane.

The block copy function of the draw processor 50 copies a source rectangle to a destination rectangle. The command preprocessor 30 programs the block copy function into the state set 0 registers that control pixel access as well as a copy/scroll source address register, a copy/scroll/fill size register, and a copy/scroll/fill destination address register.

The copy/scroll source address register specifies the initial frame buffer source address for a rectangle copy operation. The bit fields are defined below:
D<31:30>=Source Group—specifies the copy source plane group as follows.
000 Image plane group
001 Depth plane group
010 Window plane group
100 Image plane group: overlay
101 Image plane group: blue
110 Image plane group: green
111 Image plane group: red
D<25:16>=Source Y—specifies the Y source address (10 bits). Valid values are in the range 0 through 1023.
D<7:0>=Source X—specifies the X source address (8 bits). Valid values are in the range 0 through 255. The X source address is equal to the integer value of the (actual X source address)/5.

Copy/Scroll/Fill Size

The copy/scroll/fill size register specifies the size for a rectangle copy or fill operation, and the direction for a copy operation. The bit fields are defined below:
D<31>=Copy Direction—specifies the copy direction as follows:
0 Outer loop: top to bottom, inner loop: left to right, start at upper left
1 Outer loop: bottom to top, inner loop: right to left, start at lower right. For fills, set to 0.
D<7:0>=Size—specifies the x size (8 bits) of the 'block. Valid values are in the range 0 through 255. The x size is equal to the integer value of the (actual x size)/5.

The copy/scroll/fill destination address register specifies the initial frame buffer destination address for a rectangle copy operation. The bit fields are defined below:
D<31>=Byte Mode—specifies Byte or Pixel mode. Pixel mode is used for fills.
D<30:29>=Destination Group specifies the destination plane group for pixel mode. Byte mode always uses the image plane group.
00 Image plane group
01 Depth plane group 10 Window plane group 11 Image plane group + Depth plane group D<28> = Ext—specifies the destination width extension. The destination width is 1 less than the size.

D<25:16> = Destination Y—specifies the Y destination address (10 bits). Valid values are in the range 0 through 1023.

D<7:0> = Destination X—specifies the X destination address (8 bits). Valid values are in the range 0 through 255. The X destination address is equal to the integer value of the (actual X destination address)/5.

Viewport clipping in the draw processor 50 is controlled by a view clip minimum bound register and a view clip maximum bound register. The view clip minimum bound register specifies the viewport top and left (inclusive) boundaries which are the coordinates of the top left corner. The draw processor 50 clips a pixel if Y<top or if X<left, wherein Y=0 is the top of the screen and X=0 is the left side of the screen. The bit fields of the view clip minimum bound register are defined below:

D<25:16> = Top Boundary—specifies the top boundary of the clip area. The Y values are 10 bits.

D<10:0> = Left Boundary—specifies the left boundary of the clip area.

The view clip maximum bound register specifies the viewport bottom and right (inclusive) boundaries which are the coordinates of the bottom right corner. The draw processor 50 clips the pixel if X>right or if Y>bottom, wherein Y=0 is the top of the screen and X=0 is the left side of the screen. The bit fields of the view clip minimum bound register are defined below:

D<25:16> = Bottom Boundary—specifies the bottom boundary of the clip area.

D<10:0> = Right Boundary—specifies the right boundary of the clip area.

The draw processor 50 contains registers that control pick functions. The pick registers include a clear pick hit register, a set of pick ID registers, a pick minimum bound register, a pick maximum bound register, a pick front bound register, and a pick back bound register. A write to the clear pick hit register resets the pick hit output flag and enables the draw processor 50 to update the pick ID (PID) registers.

The PID registers set the current Pick IDs for the draw processor 50. The PID registers comprise a set of five 32-bit registers. The PID registers are programmed through the 3D geometry pipeline. If picking is enabled, the draw processor 50 ensures that the PID registers are not updated once a pick-hit is detected. The draw processor 50 also ensures that the PID registers are not updated until all pixels for a prior draw command are rendered without picking. The host processor 20 cannot update the PIDs via the direct pipeline during picking, but can render pixels that are subject to picking via the direct pipeline.

The pick minimum bound register specifies the pick aperture 'bottom and right (inclusive) boundaries which are the coordinates of the bottom right corner. The draw processor 50 does not generate a pick hit if X>right or if Y>bottom, wherein Y=0 is the top of the screen and X=0 is the left side of the screen. The bit fields are defined below:

D<25:16> = Bottom Boundary—specifies the bottom boundary of the pick aperture.

D<10:0> = Right Boundary—specifies the right boundary of the pick aperture.

The pick front bound register specifies the pick aperture front (inclusive) boundary. The draw processor 50 does not generate a pick hit if Z<front and the Pick CSR 3-D field is set. The pick back bound register specifies the pick aperture back (inclusive) boundary. The draw processor 50 does not generate a pick hit if Z>back and the Pick CSR 3-D field is set.

The screen door transparency feature for the draw processor 50 is specified by the contents of sixteen screen door column registers. Each screen door column register is 16 bits wide, yielding a 16×16 screen door transparency pattern. Each screen door column register defines one 16 pixel column of the screen door transparency pattern. If the pattern bit is one, the object is solid (visible) at the corresponding pixel. If the pattern bit is zero, the object is transparent and the corresponding pixel is not drawn. The column number is equal to 2×nn for even columns and 2×nn+1 for odd columns, where nn (the register address offset) ranges from 0 to 7 decimal. The bit fields for the screen door column registers are defined below:

D<31:16> = Column Odd Rows 15 through 0 are specified by bits 31 through 16.

D<15:0> = Column Even Rows 15 through 0 are specified by bits 15 through 0.

The fast clear operation in the draw processor 50 is controlled by a fast clear data register and a window background color register. The contents of the fast clear data register are written to the fast clear planes during VRAM flash write memory cycles to the frame buffer 100. The fast clear plane mask specifies the bits written. The bit fields for the fast clear data register are shown below:

D<15:10> = Fast Clear—a 6-bit field written to the fast clear planes during VRAM flash write memory cycles.

The window background color register specifies the window background color (RGBO) used in operations performed by the draw processor 50. A background of all 1's is used for the Z plane. If the window is a fast clear window, the background value is substituted for the RGBO data read from any invalid (i.e. fast cleared but not yet written) pixels during read or read/modify/write cycles, for example, ROP or antialiasing operations. The window background color is also available as one of the addend sources to the blend function of the draw processor 50. The bit fields for the window background color register are shown below:

D<31:24> = Overlay—specifies the overlay pixel value.

D<23:16> = Blue—specifies the blue pixel value.

D<15:8> = Green—specifies the green pixel value.

D<7:0> = Red—specifies the red pixel value.

The draw processor 50 contains a current window ID register and a window ID (WID) clip mask register. The current window ID register specifies the current window ID code. The current window ID code is forced into the WID planes if the force current WID attribute is enabled (bit 4 of the draw processor attribute register). The current window ID code is compared to unmasked WID planes if WID clipping is enabled.

The WID clip mask register specifies the current WID clip mask. Setting the bits in the WID clip mask register enables the corresponding bits in the current WID register during the WID clip compare.

The draw processor 50 implements 24 frame buffer Z planes that function as a depth buffer for 3-D hidden surface removal (HSR). A constant Z source register specifies a constant that can be written to the depth (Z) planes as a WID extension for window clipping or for parallel pixel mode writes.

The draw processor 50 contains an image write mask register and a window write mask register. The image write mask register provides a per plane write mask for RGBO planes. The draw processor 50 replicates bytes in all four bytes of the image plane group. The image write mask register to determine the byte written to the frame buffer. The bit fields of the image write mask register are shown below:

D<31:24>=Overlay Mask—specifies the overlay pixel mask.

D<23:16>=Blue Mask—specifies the blue pixel mask.

D<15:8>=Green Mask—specifies the green pixel mask.

D<7:0>=Red Mask—specifies the red pixel mask.

The window write mask register provides a per plane write mask for fast clear, overlay window, and image window planes. The bit fields are shown below:

D<15:10>=Fast Clear Mask—specifies the Fast Clear mask.

D<9:6>=Overlay Window Plane Mask—specifies the Overlay Window Plane mask.

D<5:0>=Image Window Plane Mask—specifies the Image Window Plane mask.

The draw processor 50 contains a constant alpha source register and a force color register. The constant alpha source register specifies a constant alpha source that may be substituted for the antialias filter alpha. The force color register specifies a constant color source that may be substituted for the color values generated by the DAA unit. The bit fields of the force color register specify red, green, and blue pixel values.

The depth cueing operations of the draw processor 50 are controlled by a depth cue Z-front register, a depth cue Z-back register, a depth cue scale register, a depth cue Z-scale register, and a depth cue fade color register. The depth cue Z-front register specifies the Z-front value for use in depth cueing. The depth cue Z-back register specifies the Z-back value for use in depth cueing. The depth cue scale register specifies the front and back scale factors for use in depth cueing. The scale values comprise 9 bits in the range 0 to 1.0. The depth cue Z-scale register specifies the Z-scale factor for use in depth cueing. The Z-scale factor consists of an 9-bit mantissa and a 6-bit exponent. The depth cue fade color register specifies the red, green, and blue fade color for use in depth cueing. Phigs+depth cueing is implemented as follows:

$C = S\ C_i + (1-S)\ C_d$

Where:

C=Component of depth cued color
$C_i$=Component of the input color
$C_d$=Component of the depth cue fade color
S=Depth cue scale factor that is computed in the draw processor 50 as follows:
  If Z is in front of Z-front, then S=front scale
  If Z is behind Z-back, then S=back scale
  If Z is between Z-front, and Z-back then
  S=back scale+(Z−Zback)* Zscale FIGS. 10–13 illustrate the pixel operations of the draw processor 50, and show the conditions tested by the draw processor 50 prior to pixel writes to the frame buffer 100. FIG. 10 illustrates the pixel operations for the fast clear planes. FIG. 11 illustrates the pixel operations for the window ID planes. FIG. 12 illustrates the pixel operations for the image (ORGB) planes. FIG. 12 illustrates the pixel operations for the depth planes. The definitions of the conditions shown in the columns of the FIGS. 10–13 are set forth below.

The pix in viewport condition if a "1" indicates that the pixel is in the viewport defined by the view clip minimum bound and the view clip maximum bound registers.

The pick without render condition if a "1" indicates a pick control code (i.e. bits 31:29 of the draw processor attribute register) of 10x, which specifies enable picking and no rendering while picking.

The WID match condition indicates that for each bit that is 1 in the WID clip mask register, the bit in fb data in equals the corresponding bit in the current window ID register, wherein fb data in is the unmodified pixel data.

For the HSR win condition, H is bit 17 (hidden surface removal enable) of the draw processor attribute register, and X is bit 14 (WID extension clip enable) of the draw processor attribute register.

For X=0, H=0: hsr.win=1
For X=0, H=1: if (Znew,=Zold) hsr.win=1; else hsr.win=0
For X=1, FI=0: if (Znew==Zold) hsr.win==1; else hsr.win=0
For X=1, H=1: if (Znew==Zold) hsr.win==1; else hsr.win=0

The screen door write enable condition if a "0" indicates that bit 27 (screen door enable of the draw processor attribute register) is a "1" and the selected screen door bit is "0".

The fast clear enable condition is a bit 10 (fast clear enable) of the draw processor attribute register. The fast clear bit if a "1" indicates that the I and D planes are valid.

The access mode conditions are as follows:
I=Image (ORGB) planes, Direct Port write or read
D=Depth (Z) plane, Direct Port write or read
W=Window (FC+WID) planes, Direct Port write or read
ID=Image+Depth, 3D write only or Direct Port write only The definitions for the data out to frame buffer are as follows. The element "Bit M (m, Side 1, Side 0)" means that for each bit in mask m, if m=0 select side 0 bit, and if m=1 select side 1 bit. "FB Data In" means that data written to the frame buffer 100 is the same as data read in from the frame buffer 100, i.e. the pixel is unmodified.

For example, the first line of FIG. 12 indicates that for a window access, data is never written out to the ORGB planes frame buffer of the frame buffer 100 (Data Out to FB=FB Data In). The second line of FIG. 12 indicates that (for an I, D, or ID access) if the pixel is not in the viewport, the pixel is not written (Data Out to FB=FB Data In). The eighth line of FIG. 12 indicates that for an I or ID pixel access, if all the conditions to the left of the vertical line are met, the data read in from the frame buffer 100 is passed to the ROP and blend units unchanged and data written out to the frame buffer 100 is the output of the ROP/Bland Unit (under control of the write mask).

In the foregoing specification the invention has been described with reference to specific exemplary embodiments thereof it will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. A draw processor for a graphics accelerator, comprising:

geometry pipeline interface circuit coupled to receive a draw packet that contains a set of geometry parameters that define a geometry object including high level screen space descriptions of two dimensional and three dimensional point line and area graphics primitives, the geometry pipeline interface circuit having circuitry that generates a set of adjusted geometry parameters by biasing an x coordinate of each geometry parameter according to an interleave value assigned to the draw processor;

rendering circuit coupled to receive the adjusted geometry parameters from the geometry pipeline interface circuit and having circuitry that generates a set of pixels corresponding to the geometry object by performing edgewalking and scan interpolation functions for the adjusted geometry parameters.

2. The draw processor of claim 1, wherein the geometry pipeline interface circuit generates the adjusted geometry parameters by adding the interleave value to the x coordinate of each geometry parameter.

3. The draw processor of claim 2, wherein the graphics accelerator includes a frame buffer having N horizontal interleaves, and wherein the interleave value is in a range of 0 through N−1 such that the rendering circuit generates every $N^{th}$ pixel on each of a set of scan lines of a rasterized image corresponding to the geometry object.

4. The draw processor of claim 3, wherein the frame buffer comprises 5 horizontal interleaves, and wherein the interleave value is in a range of 0 through 4 such that the rendering circuit generates every fifth pixel on each scan line.

5. The draw processor of claim 1, further comprising a direct port interface circuit coupled to receive a direct port packet that contains a set of pixel function parameters that specify a pixel function of the draw processor from among a set of pixel functions comprising a pixel depth cue function, a write pixel function, and a pixel block copy function.

6. The draw processor of claim 5, further comprising a memory control circuit coupled to receive the pixels from the rendering circuit and the pixel function parameters from the direct port interface circuit, the memory control circuit having circuitry that writes the pixels into a corresponding interleave portion of a frame buffer while performing the pixel function specified by the pixel function parameters.

7. A graphics accelerator, comprising a frame buffer having N horizontal interleaves and further comprising a set of N draw processors each coupled to receive a draw packet over a draw bus from a floating-point processor in the graphics accelerator wherein the draw packet contains a set of geometry parameters that define a geometry object including high level screen space descriptions of two dimensional and three dimensional point line and area graphics primitives, each draw processor having a unique assigned interleave value in a range 0 through N−1, each draw processor having circuitry that generates a set of adjusted geometry parameters by biasing an x coordinate of each geometry parameter according to the unique assigned interleave value, each draw processor having circuitry that renders a set of pixels corresponding to the geometry object by performing edgewalking and scan interpolation functions for the adjusted geometry parameters such that each draw processor generates every $N^{th}$ pixel on each of a set of scan lines of a rasterized image corresponding to the geometry object.

8. The graphics accelerator of claim 7, wherein the frame buffer comprises 5 horizontal interleaves, and wherein each interleave value is in a range of 0 through 4 such that each draw processor renders every fifth pixel on each scan line.

9. The graphics accelerator of claim 7, wherein each draw processor comprises:

geometry pipeline interface circuit coupled to receive the draw packet over the draw bus, the geometry pipeline interface circuit generating the adjusted geometry parameters by biasing the x coordinate of each geometry parameter according to the unique assigned interleave value assigned to the draw processor;

rendering circuit coupled to receive the adjusted geometry parameters from the geometry pipeline interface circuit and having circuitry for generating the pixels corresponding to the geometry object by performing edgewalking and scan interpolation functions for the adjusted geometry parameters.

10. The graphics accelerator of claim 9, wherein each geometry pipeline interface circuit generates the corresponding adjusted geometry parameters by adding the corresponding unique assigned interleave value to the x coordinate of each corresponding geometry parameter.

11. The graphics accelerator of claim 10, wherein each draw processor further comprises a direct port interface circuit coupled to receive a direct port packet over the draw bus that contains a set of pixel function parameters that specify a pixel function of the draw processor from among a set of pixel functions comprising a pixel depth cue function, a write pixel function, and a pixel block copy function.

12. The graphics accelerator of claim 11, wherein each draw processor further comprises a memory control circuit coupled to receive the corresponding pixels from the corresponding rendering circuit and the pixel function parameters from the corresponding direct port interface circuit, the memory control circuit having circuitry that writes the corresponding pixels into a corresponding interleave portion of the frame buffer while performing the pixel function specified by the corresponding pixel function parameters.

13. A method for rendering in a graphics accelerator, comprising the steps of:

receiving a draw packet that contains a set of geometry parameters that define a geometry object including high level screen space descriptions of two dimensional and three dimensional point line and area graphics primitives;

generating a set of adjusted geometry parameters for each of a set of N horizontal interleaves of a frame buffer by biasing an x coordinate of each geometry parameter according to a unique assigned interleave value for each horizontal interleave;

rendering a set of pixels corresponding to the geometry object by performing edgewalking and scan interpolation functions for the adjusted geometry parameters such that for each horizontal interleave every $N^{th}$ pixel on each of a set of scan lines of a rasterized image corresponding to the geometry object is rendered.

14. The method of claim 13, wherein the frame buffer comprises 5 horizontal interleaves, and wherein each unique assigned interleave value is in a range of 0 through 4 such that each horizontal interleave of the frame buffer stores every fifth pixel on each scan line.

15. The method of claim 13, wherein the step of generating the adjusted geometry parameters for each horizontal interleave comprises the step of adding the corresponding unique assigned interleave value to the x coordinate of each corresponding geometry parameter.

16. The method of claim 15, further comprising the step of receiving a direct port packet that contains a set of pixel function parameters that specify a pixel function from among a set of pixel functions comprising a pixel depth cue function, a write pixel function, and a pixel block copy function.

17. The method of claim 16, further comprising the steps writing the pixels into the interleaves of the frame buffer while performing the pixel functions specified by the corresponding pixel function parameters.

* * * * *